Sept. 1, 1936.  A. O. EDWARDS  2,052,969
AIR CONDITIONING APPARATUS
Filed May 2, 1932  2 Sheets-Sheet 1
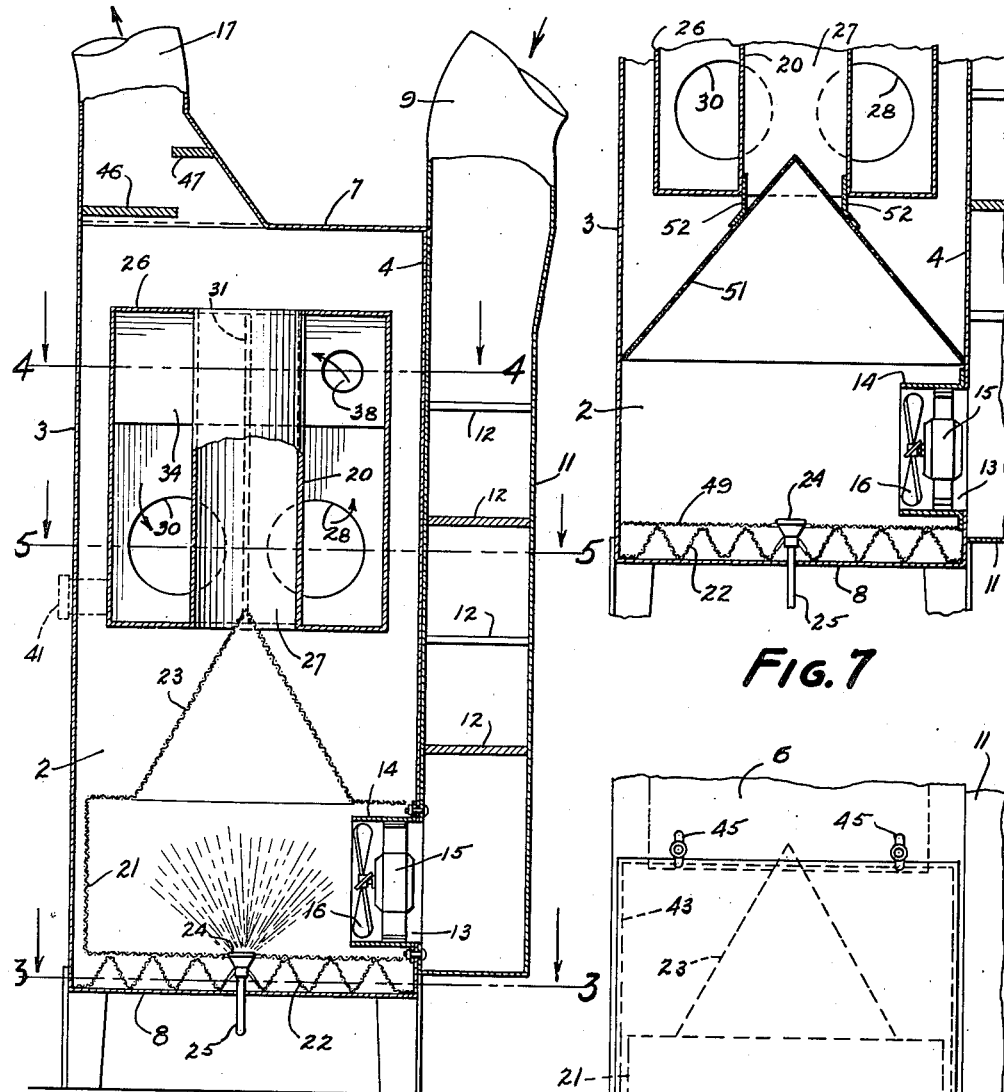
Fig. 1
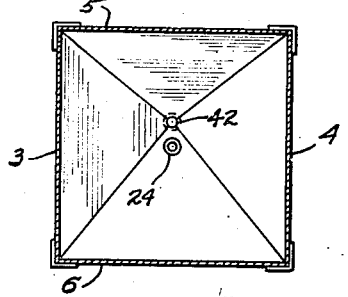
Fig. 3
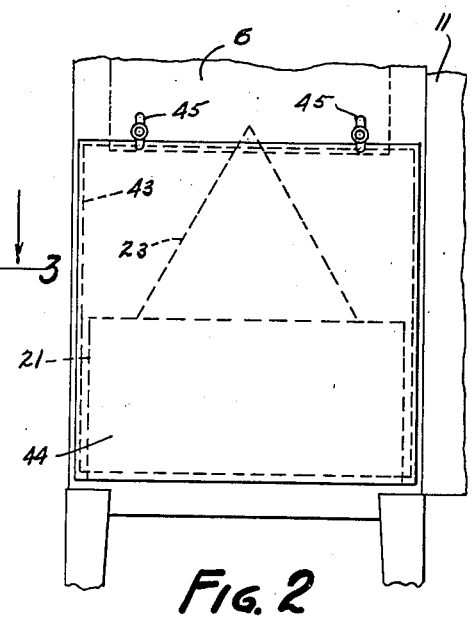
Fig. 7
Fig. 2
INVENTOR
ARTHUR O. EDWARDS
By Paul, Paul & Moore
ATTORNEYS Sept. 1, 1936.  A. O. EDWARDS  2,052,969
AIR CONDITIONING APPARATUS
Filed May 2, 1932  2 Sheets-Sheet 2
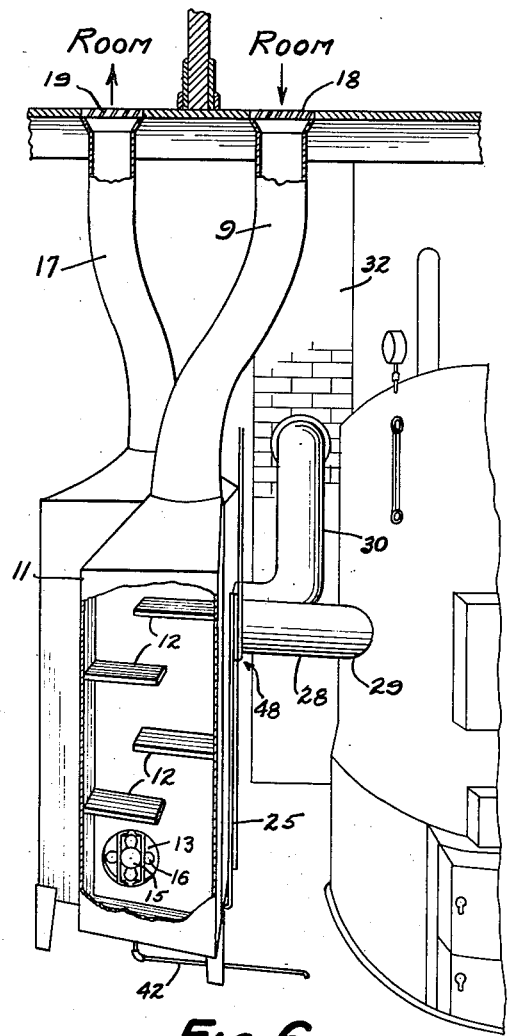
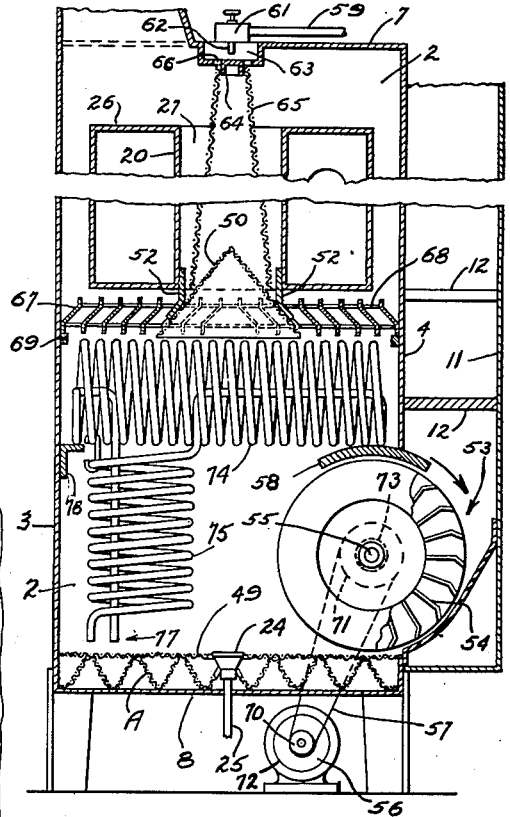
INVENTOR
ARTHUR O. EDWARDS
ATTORNEYS Patented Sept. 1, 1936

2,052,969

UNITED STATES PATENT OFFICE 2,052,969

AIR CONDITIONING APPARATUS

Arthur O. Edwards, Minneapolis, Minn.

Application May 2, 1932, Serial No. 608,650

15 Claims. (Cl. 257—8)

This invention relates to a novel air conditioning apparatus adapted for use to recondition and purify the air circulated in the rooms of buildings and the like.

An object of the invention is to provide an air conditioning apparatus comprising a casing whose walls define a chamber having suitable conduits connecting it with a room, and a heating drum being mounted in said chamber and having pipes connecting it with the smoke outlet of a furnace and with a chimney, whereby the products of combustion from the furnace may circulate therethrough and heat the walls thereof, so that the air passing through said chamber will be heated and returned to the room as warm air.

A further object of the invention is to provide an apparatus of the class described comprising a casing which constitutes a chamber having means provided therein for purifying and heating the air passing therethrough, and said chamber having cold and warm air conduits connecting it with a room, whereby the cold, impure air in a room may be circulated therethrough and purified, and the air heating means provided in said chamber being connected in the usual smoke pipe leading from the furnace to the smoke stack or chimney, whereby the waste heat from the furnace, which usually passes up the chimney to the atmosphere and is lost, is utilized to heat the air passing through said chamber, whereby said air is delivered to the room as warm, pure, humidified, washed air.

A further object is to provide an air conditioning apparatus provided with means whereby it may be used in connection with a furnace, as a heat economizer, by extracting from the furnace smoke pipe, the heat which usually passes therethrough to the chimney as waste, and delivering it into a room or space to be heated; and which also has means for drawing cold impure air from a room and thoroughly washing and purifying it, and saturating it with moisture, and returning it to the room or building as warm, moist air, whereby the relative humidity or moisture content of the air in the building may be maintained at the desired percentage of relative humidity; and which apparatus may also be used in extremely hot weather to supply the building with cool, washed air, to render the building more livable and comfortable in hot dry weather.

Other objects of the invention reside in the novel construction of the apparatus, whereby it may readily be connected to any furnace, whether hot water, vapor, warm air or steam, and to the room or space to be supplied with pure air; in the particular construction of the air heating drum provided within the air circulating chamber, whereby the waste heat passing through the furnace smoke pipe to the chimney, will be retained in said drum and thus heat the walls thereof, whereby said heat may be absorbed by the air current passing through said chamber before said air is returned to the room; in the novel construction of the air heating drum, whereby the smoke inlet and outlet connections thereof are disposed at the lower portion thereof so that the waste heat, smoke and hot gases passing therethrough from the furnace to the chimney, may rise into and be pocketed in the upper portion of the drum to thereby heat the walls thereof to a high temperature; and whereby the furnace gases may circulate through the apparatus, without being retarded, as when a down draft baffle is used; in the means provided in the lower portion of the chamber to wash the air and remove therefrom all impurities which may be drawn into said chamber through the cold air conduit; in the means for absorbing and eliminating disturbing sounds and noises which may develop in the apparatus, whereby the apparatus will be very quiet in operation; in the means provided for introducing water into the air circulating chamber at different locations, whereby the air passing therethrough will be thoroughly washed, purified, and properly saturated, so that it will be discharged back into the room as pure, washed, humidified air; in the means provided within the air circulating chamber for increasing the effective surface area thereof, against which the air passing through said chamber may impinge to thereby considerably cool the air before it is returned to the room, as when the apparatus is used for supplying cool, washed air to a building in hot weather; and in the means whereby a suitable electric refrigerating unit, or other air cooling medium may be used to further cool the air.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a vertical sectional view showing the apparatus in one form;

Figure 2 is an outside elevation of the lower portion of the casing showing the door provided therein, whereby access may be had to the interior thereof;

Figure 3 is a cross-sectional view on the line 3—3 of Figure 1, on a smaller scale, showing the means for introducing water into the lower portion of the chamber, and also showing the drain provided therein;

Figure 4 is a cross-sectional view on the line 4—4 of Figure 1, showing the arrangement of the baffles provided in the upper portion of the heating drum;

Figure 5 is a cross sectional view on the line 5—5 of Figure 1, showing the pipes provided at the lower portion of the heating drum for connecting it to the smoke pipe of a furnace and the chimney;

Figure 6 is a perspective view showing the apparatus connected with a furnace and a room;

Figure 7 is a view showing a modified construction; and

Figure 8 is a view showing another modification.

The novel air conditioning apparatus disclosed in this invention is shown comprising a main casing whose upright walls 3, 4, 5, and 6, top wall 7, and bottom wall 8, define an air-circulating chamber 2. A cold air conduit 9 is shown leading from a room to the upper portion of a rectangular casing 11, having a plurality of horizontally disposed baffles 12 mounted therein and arranged in staggered relation, as shown in Figure 6. The baffles 12 are constructed of a suitable sound absorbing material and function to absorb any sounds and noises which may develop in the chamber 2 from the operation of the motor and fan, and also from the water spraying means, which latter will subsequently be described.

An opening 13 is provided at the lower portion of the casing 11 to establish communication between the interior of this casing and the chamber 2. A suitable cylindrical member or collar 14 is shown mounted in the opening 13 to support a suitable motor 15 which has a fan 16. A conduit 17, similar to the conduit 9, is shown connected with the upper wall 7 of the main casing and leads to a room above, as shown in Figure 6. Suitable registers 18 and 19 may be provided at the intake and discharge ends of the conduits 9 and 17, respectively, to prevent articles from dropping into the conduits and apparatus.

Means is provided in the lower portion of the chamber 2 for removing from the air drawn into the chamber, dirt, dust and other foreign particles and impurities which may be conveyed from the room through the conduit 9. Such means is here shown consisting of a suitable filtering member 21 mounted in the lower portion of the chamber 2 upon a suitable supporting member 22. The walls of the filtering member 21 are formed of a suitable perforated material such as finely woven wire mesh to permit the air and moisture to pass therethrough. The supporting member 22 is shown corrugated in cross-section so as to space the bottom wall of the filtering member 21 from the bottom wall 8 of the chamber 2. The upper wall of the member 21 has a cone-shaped portion 23 arranged substantially directly over a suitable spray nozzle 24, having a pipe 25 connecting it with a suitable source of water supply, not shown in the drawings. The nozzle 24 projects through the bottom wall of the filtering member 21 and is adapted to project a spray of water into said member substantially as indicated in Figure 1. Two or more such sprays may be used, if desired.

An important feature of this invention resides in the means provided within the chamber 2 for heating the air passing therethrough. As shown in Figure 1, an air heating drum 26 is mounted within the upper portion of the chamber 2 with its walls spaced from the corresponding walls of said chamber so as to provide air circulating passages around the heating drum. The heating drum 26 has a tubular member 20 therein, the ends of which are secured to the top and bottom walls of the drum casing to provide a central air circulating passage 27 through the drum, through which portions of the air circulating through the chamber 2 passes, as the air is circulated upwardly through the chamber by the fan 16. The ends of the tubular member 20 are secured to the walls of the drum in hermetically sealed relation.

A pipe 28 is connected with the lower portion of the heating drum 26 and leads therefrom through the wall 5 of the chamber 2 and is connected with the usual smoke outlet 29 of a furnace, as shown in Figure 6. A similar pipe 30 is also connected with the heating drum 26 and leads therefrom to the usual chimney 32 of the building. A suitable partition 31 extends from the tubular member 20 to the wall of the drum to which the pipes 28 and 30 are connected, as shown in Figures 4 and 5. By thus connecting the heating drum with the smoke outlet of the furnace and with the chimney, and because of the partition 31, the products of combustion discharging from the furnace will circulate through said drum before it reaches the chimney, and thereby heat the walls of the drum, so that the air circulating through the chamber 2 will be heated before it is returned to the room, as a result of contacting with the heated walls of said drum. It will thus be noted that the heat which otherwise would be wasted up through the chimney, is utilized for heating the air circulated through the chamber 2, whereby the apparatus also operates as a heat saver, when the furnace is operating, in that it extracts the waste heat from the furnace smoke pipe and delivers it to the room for heating purposes.

In order to utilize substantially all of the waste heat passing from the furnace to the stack, the pipes 28 and 30 are preferably situated in close proximity to the bottom wall of the heating drum 26, as best shown in Figure 1, but it is to be understood that they may be situated anywhere between the horizontal center line of the drum and the bottom wall thereof. The pipes 28 and 30 are also situated at substantially the same elevation so that the furnace gases, in passing through the heating drum will not be retarded. By thus arranging said pipes, the objectionable down-draft feature common in apparatus of this general nature using a down-draft baffle, is eliminated. A plurality of upright plates 33, 34, 36, and 37 are shown provided in the upper portion of the heating drum, as shown in Figures 1 and 4. These plates are secured to the walls of the drum and cooperate therewith to provide a plurality of pockets into which the hot gases from the pipe 28 rise. Certain of the plates 34 are provided with suitable apertures 38, through which the gases may circulate from one pocket to another, and thereby heat said plates to substantially the temperature of the hot furnace gases. This heat is then conducted to the outer walls of the heating drum 26 where it is absorbed by the moist air passing upwardly through the chamber 2 for delivery to the room. By thus absorbing the heat from the walls of the upper portion of the heating drum, the air is heated before it is returned to the room, and the gases discharging from the drum through the pipe 30 to the chimney, will be substantially cool, as compared to the temperature of the furnace gases entering the heating drum through the pipe 28. As the hot furnace gases circulate around the tubular member 20, as indicated by the arrows in Figure 5, they will rise into the pockets at the upper portion of the heating drum, and thereby force the cooled gases downwardly into the lower portion of the drum, as indicated in Figure 1, and from whence they are discharged through the pipe 30 to the chimney. A suitable cleanout 41 is shown provided in the lower portion of the drum 26, whereby the latter may readily be cleaned, when necessary. This cleanout may be situated at any suitable place in the lower portion of the drum, as may be desired. A suitable drain pipe 42 is provided in the bottom wall 8 of the chamber 2 which may be connected to a suitable receiving means such as a floor drain or the sewer.

To gain access to the interior of the lower portion of the chamber 2, the front wall 6 of the main casing is shown provided with a suitable door opening 43, adapted to be closed by a suitable door 44, which may be secured in position by suitable clamps or locking members 45, as shown in Figure 2. When this door is removed, free access may be had to the interior of the lower portion of the chamber, as will readily be understood by reference to Figure 2, to permit the removal of the filtering member 21, and also whereby access may be had to the motor 15 and fan 16.

Suitable baffles 46 and 47 are shown provided at the intake end of the conduit 17, as will be noted by reference to Figure 1. These baffles are arranged as shown and function to prevent objectionable sounds and noises which may develop within the apparatus, from being conveyed through the pipe 17 to the room.

In the operation of the apparatus above described, the heating drum 26 is connected with the furnace and chimney as shown in Figure 6, so that the products of combustion will circulate through said drum and heat the walls thereof, as hereinbefore stated. Because of the action of the fan 16 and spray nozzle 24, impure air will be drawn downwardly through the cold air conduit 9 from the room, and will be delivered into the filtering member or box 21 where it will be given a thorough washing by the whirling action of the spray and the action of the fan. The air then passes through the perforated walls of the filtering member 21 and its cone 23, carrying with it minute particles of moisture and water, and this saturated air then passes upwardly through the central passage 27 provided in the heating drum 26, and through the air passages provided between the walls of the heating drum and the walls of the main casing, whereby the heat in the walls of the drum is absorbed by the air and carried upwardly into the room through the conduit 17. It is to be understood, of course, that the walls of the heating drum are hermetically sealed so that the products of combustion passing therethrough cannot escape into the chamber 2.

To render the apparatus more efficient, the water projected from the spray nozzle 24, is preferably heated, and this may be accomplished by coiling the pipe 25 around the hot smoke pipe 28, leading from the furnace to the heating drum, as shown at 48 in Figures 5 and 6. By thus coiling the pipe 25, which may be of copper tubing, about the pipe 28, the walls of the water pipe will be heated so that the water flowing therethrough will become heated before it reaches the spray nozzle 24. Suitable means, not shown, may be provided for controlling the supply of water projected from the nozzle 24. The surplus water which is not carried off by the current of air passing through the chamber 2, will be precipitated into the bottom of said chamber and discharge through the drain pipe 42.

The perforated walls of the filtering member 21 and the cone-shaped member 23 are preferably made of comparatively fine copper wire screen, and prevent foreign matter such as lint, dust, and other particles drawn into the filtering member 21, from passing therethrough and into the upper portion of the chamber 2. All such impurities are washed from the air and delivered into the bottom of the chamber 2. The bottom wall of the filtering member 21 may be constructed of a relatively coarser screen so as to permit the impurities to readily pass therethrough into the bottom of the chamber to be discharged therefrom with the surplus water through the drain 42. The corrugated supporting member 22, upon which the filtering member 21 is supported, spaces the bottom of the filtering member 21 from the bottom wall 8 of the chamber 2, so that the water dripping from the upper walls of the filtering member will not impinge directly against the bottom wall 8 of the main casing, but will engage the perforated bottom of the member 21 and the corrugations of the supporting member 22, thereby eliminating any noise which might be caused, if the water were allowed to drip directly against the bottom wall 8 of the main casing.

The baffles 12 provided in the casing 11 of the conduit 9 are, as hereinbefore stated, of a suitable sound-absorbing material, and because of being staggered as shown in Figure 6, they positively prevent any noise which may develop within the apparatus by the action of the fan or the water spray, from being conveyed upwardly through the conduit 9 into the room. In like manner, the baffles 46 and 47 in the warm air conduit 17 prevent noise from being conveyed upwardly therethrough into the room.

In actual operation, the novel air conditioner herein disclosed has been found to remove substantially all impurities from the air circulated therethrough. Also, by reason of the heating drum 26 within the chamber 2, it operates as a heat economizer, in that it extracts substantially all of the heat from the furnace smoke pipe, which otherwise would pass up the chimney as wasted heat. This is a very important feature, particularly when the apparatus is used in connection with oil burning furnaces, for the reason that in such furnaces, a considerable amount of heat is usually lost up through the chimney. By passing the furnace gases through the heating drum 26, the heat, which otherwise would be wasted in the chimney, is absorbed by the air currents passing through the chamber 2 and is delivered into the room through the conduit 17. It will thus be seen that, in addition to supplying pure washed air to the room, the apparatus also provides means for supplying heat thereto, with the resultant reduction in the amount of fuel consumed by the furnace.

In Figure 7, I have illustrated an apparatus wherein the filtering member 21 has been dispensed with, and in lieu thereof, a suitable perforated plate or screen 49 is supported directly upon the corrugated supporting member 22. A pyramidal screen filter 51 is supported above the fan 16 by such means as brackets 52, which may be secured to the heating drum 26, as shown. The lower edges of the screen filter 51 are preferably arranged to substantially engage the walls of the main casing, as shown, so as to cause all of the air circulating through the chamber 2 to pass therethrough. Water is delivered into the bottom of the chamber 2 by means of the nozzle 24 in a manner similar to that shown and described with reference to Figure 1. As hereinbefore stated, one or more spray nozzles may be used to supply moisture to the air circulated through the chamber 2.

In Figure 8, I have illustrated an apparatus which, like the structure shown in Figure 7, comprises a perforated plate or screen 49 supported directly upon the corrugated supporting member 22. A perforated member 50 is shown supported from the heating drum 26 by brackets 52. A fan 53, comprising a plurality of radially disposed blades 54, is employed in lieu of the fan 16, shown in Figures 1 and 7. The fan 53 has a shaft 55 mounted in suitable bearings, not shown in the drawings, and may be driven from a suitable motor 56 operatively connected therewith by a suitable belt 57. In some instances it may be desirable to operate the fan at different speeds as, for example, when the apparatus is used for supplying cool, washed air to a building in the summer time, it may be desirable to operate the fan at a relatively higher speed, than when the apparatus is used for supplying warm, washed moist air to the building in cold weather. Where only two speeds are required to thus control the operation of the fan, two sets of pulleys may be provided for the belt 57, as, for example, pulleys 70 and 71 may be used for operating the fan at low speed, and pulleys 72 and 73 for operating it at high speed. In some cases, it may be desirable to employ a variable speed motor. A curved plate 58 is provided over the fan 53 and extends into the casing 11 so as to guide the air flowing downwardly through said casing into contact with the blades 54 of the fan, as will readily be understood by reference to Figure 8.

In Figure 8, I have shown an apparatus for supplying cool, washed air to a building. When thus used, suitable refrigerating coils 74 and 75 may be positioned within the lower portion of the chamber 2 of the main casing in such a manner that the water spraying from the nozzle 24 will be projected against the coils of the refrigerating unit by the action of the fan 53. The impure warm air drawn into the chamber 2 of the main casing from the room, through the conduit 9 and casing 11, is also projected against and between the coils of the refrigerating units, whereby the air, in addition to being thoroughly washed and cleansed, is also cooled before being returned to the room through the conduit 17. The refrigerating coils 74 and 75 may be connected in series as indicated, and they may be demountably supported in the chamber 2, upon the curved plate 58 and a bracket 76 secured to the wall 3 of the casing. The usual operating mechanism for circulating a cooling medium through the coils 74 and 75, is not shown in the drawings, but may be connected thereto at 77, in the usual well-known manner.

In some instances, as for example, in large buildings, it may be necessary to introduce additional water into the chamber 2 of the main casing in order to bring the purified air delivered to the room up to the desired saturation point. To thus introduce additional moisture, I have shown in Figure 8, an auxiliary water supply pipe 59 provided with a suitable pressure relief valve 61, having a drip pipe 62 disposed over a cup-shaped depression 63, shown provided in the upper wall 7 of the main casing. A depending flange may be formed on the bottom wall of the cup-shaped member 63 adapted to receive the upper end of a frusto-conical member 65, the lower end of which may be supported directly upon the upper end of the perforated member 50 which, it will be noted, projects into the central passage 27 of the heating drum 26. Suitable apertures 66 are provided in the bottom wall of the cup-shaped member 63, through which the water delivered thereto from the valve 61, may discharge and flow downwardly over the perforated wall of the member 65. This member is preferably constructed of a suitable wire mesh similar to that from which the cone member 50 is constructed.

In the operation of the apparatus shown in Figure 8, water may be delivered into the bottom and top of the chamber 2 simultaneously, or it may be delivered thereinto from the bottom only or, if desired, from the top only. When the apparatus is used for supplying pure, washed air to a comparatively large room, water may be supplied into the air current from both the top and bottom of the chamber 2, and by regulating the supply of water delivered to the nozzle 24 and valve 61, the moisture content of the purified air delivered to the room may be controlled to the desired percentage.

In Figure 8, I have also shown provided directly beneath the heating drum 26, a plurality of deflectors 67, preferably shaped cross sectionally, as shown, and extending from the front wall 6 to the rear wall 5. These deflectors are spaced apart and secured together by suitable ties 68 which may be in the form of rods or wires to provide an integral structure, which structure may be removably supported within the casing by suitable rails 69 secured to the walls of the casing.

The deflectors 67 are preferably removed from the chamber 2, when the apparatus is used in the winter time for supplying warm, humidified air to the room. They are useful, however, during extremely hot weather, when the apparatus is used for supplying cool, washed air to the room. When thus used, the heating drum 26 does not function because of the furnace being inoperative. Cold water is delivered into the lower portion of the chamber 2 from the spray nozzle 24, in the usual manner, and simultaneously as impure, warm air, is drawn thereinto from the room, through the conduit 9. The fan 53 forces the air and water against and between the coils of the refrigerating elements 74 and 75, and portions of the water will impinge against the deflectors 67, from which it will be precipitated into the bottom of the chamber 2 to the overflow.

Because of the cold water thus being projected against the deflectors 67, their surfaces are cooled so that the partially cooled, washed air impinging thereagainst, as it flows upwardly through the chamber 2, will be further cooled, with the result that the washed, pure air delivered to the room will be cool and comfortable, even in the hottest weather. The action of the fan maintains a constant circulation of air through the apparatus, whereby cool, washed, pure air is continuously being supplied to the room, while the warmer impure air is being withdrawn therefrom to be purified. The deflectors 67 also prevent too much moisture or water from being carried upwardly into the room through the conduit 17, and they may readily be removed from the chamber 2, through the door opening 43, by first removing the perforated member 50.

The apparatus as shown in Figures 1 to 6, inclusive, may also be used to supply cool, washed air to a room or building, during hot weather, by simply circulating the air through the cold water spraying from the nozzle 24 and circulating it upwardly through the chamber 2 and through the conduit 17 to the room. In some instances, a suitable cooling medium such as a piece of ice, or an electric refrigerating unit, may be provided within the lower portion of the chamber 2, in lieu of the filtering member 21 and 23, and spray nozzle 24, in which case, the air returned to the room will be cooled by the action of the refrigerating medium. With this arrangement, it is also desirable to use the water spray in that the air then circulated through the casing will be thoroughly washed and cleansed of all impurities, before it is returned to the room as cool washed air.

I claim as my invention:

1. In an air conditioning apparatus, a casing whose walls define a chamber, a heating drum in said chamber having means for connecting it with the smoke outlet of a furnace and with a chimney whereby the products of combustion from the furnace may circulate therethrough and heat the walls thereof, the walls of said drum being spaced from the corresponding walls of said casing to provide air-circulating passages, a conduit connecting a room with said chamber at a location below said drum for conveying impure air thereto from the room, another conduit leading from the upper portion of the chamber to the room and adapted to convey conditioned air thereto, a filtering member in said chamber through which the impure air must pass before it contacts with the heated walls of said drum, and means for introducing moisture into the air delivered to said chamber, before it is returned to the room.

2. In an air conditioning apparatus, a casing having a chamber therein, a heating drum in the upper portion of said chamber provided with means for connecting it with the smoke outlet of a furnace and with a chimney whereby the products of combustion from the furnace may circulate therethrough and heat the walls thereof, a cold air conduit connecting a room with the lower portion of said chamber for conveying impure air thereto from the room, another conduit leading from the top of the chamber to the room and adapted to convey warm, conditioned air thereto, an air filtering member in said chamber into which the impure air is delivered from said cold air conduit, means for washing the air delivered into said filtering member, and means for circulating air through the apparatus.

3. In an air conditioning apparatus, a casing whose walls define a chamber, an air heating drum mounted in said chamber with its walls spaced from the walls thereof, means by which the lower portion of said heating drum may be connected with the smoke outlet of a furnace and with a chimney to cause the products of combustion from the furnace to circulate therethrough and heat its walls, an air conduit connecting a room with one end of said chamber for conveying unconditioned air thereto from the room, means connecting the opposite end of the chamber with the room and adapted to convey conditioned air thereto, a filtering member in said chamber, a nozzle for spraying water into said filtering member to wash and cleanse the air circulated therethrough, means for circulating air from the room through said member and chamber, and means for heating the water projected from said nozzle.

4. In an air conditioning apparatus, a casing whose walls define a chamber having cold and warm air conduits connecting it with a room, an air heating drum mounted within said chamber and having means for connecting it with the smoke outlet of a furnace and with a chimney to cause the products of combustion from the furnace to circulate therethrough and heat its walls, and means in the upper portion of said heating drum forming pockets adapted to receive the hot furnace gases discharging from the furnace whereby said gases will heat the walls of the heating drum, and the waste heat thus being conveyed to the walls of said drum from the furnace smoke outlet being absorbed by the air current passing through said chamber whereby said air is heated before being returned to the room.

5. In an air conditioning apparatus, a casing having a chamber therein provided with cold and warm air conduits for connecting it with a room, an air heating drum mounted within said chamber and having pipes connecting it with the smoke outlet of a furnace and with a chimney to cause the products of combustion from the furnace to circulate therethrough and heat the walls thereof, said heating drum being situated between the connections of said conduits with said casing, and a series of upright baffles in said heating drum adapted to be impinged by the hot furnace gases passing therethrough and conduct the heat from said gases to the walls of the drum to heat said walls, and the heat in the walls of said drum being absorbed by the air passing through said chamber, whereby the heat which otherwise would pass up the chimney is utilized.

6. In an air conditioning apparatus, a casing having a chamber therein provided with cold and warm air conduits for connecting it with a room, an air heating drum mounted within said chamber and having pipes connecting the lower portion thereof with the smoke outlet of a furnace and with a chimney to cause the products of combustion from the furnace to circulate therethrough and heat the walls thereof, said heating drum being situated between the connections of said conduits with said casing, and a series of vertically disposed baffles depending from the upper wall of said drum and cooperating with the vertical walls thereof to provide a plurality of interconnected pockets into which the hot furnace gases rise and heat the walls thereof, said baffles conducting the heat from the hot furnace gases to the walls of said drum, whereby the air passing through said chamber may absorb the heat in the walls of the drum and convey it to the room to thereby utilize the heat which otherwise would pass up the chimney.

7. In an apparatus adapted for use in connection with a furnace to utilize the waste heat which normally passes up the chimney from the smoke outlet of the furnace, a casing having a chamber therein, a return cold air conduit connecting the lower portion of the chamber with a room and a warm air conduit connecting the upper portion of the chamber with the room, a heating drum mounted within the chamber and connected with the smoke pipe of the furnace and with the chimney whereby the products of combustion will circulate therethrough, a series of vertically disposed baffles in the upper portion of said drum forming pockets into which the hot gases from the furnace may rise and thereby heat the upper walls of the drum, alternate baffles having apertures therein to permit circulation therethrough, means for drawing impure air from the room and circulating it through said chamber in contact with the walls of said drum, whereby the heat which otherwise would be wasted up the chimney will be absorbed by said air and discharged into the room to heat the latter, and means for humidifying the air circulated through said chamber.

8. In an air conditioning apparatus, a casing whose walls define a chamber, an air heating drum mounted in said chamber with its walls spaced from the walls thereof, pipes for connecting the lower portion of said heating drum with the smoke outlet of a furnace and with a chimney to cause the products of combustion from the furnace to circulate therethrough and heat its walls, an air conduit connecting a room with the lower portion of said chamber for conveying impure air thereto from the room, another conduit connecting the upper portion of said chamber with the room and adapted to convey conditioned air thereto, an air filtering member in the lower portion of the chamber into which the impure air is delivered from the room, said filtering member having perforated walls, a spray nozzle in said member for spraying water into the path of the incoming impure air to wash and purify the latter, and means for forcibly circulating the air through the chamber.

9. In an air conditioning apparatus, a casing having a chamber therein provided with cold and warm air conduits for connecting it with a room, a heating drum disposed within said chamber and having pipes connecting it with the smoke outlet of a furnace and with a chimney whereby the products of combustion discharging from the furnace will circulate therethrough and heat the walls thereof, the walls of said heating drum being spaced from the corresponding walls of the casing to provide a plurality of air circulating passages, and said drum also having a central air circulating passage therein, means for washing and humidifying the air passing through said chamber, and a fan for drawing impure air from the room and circulating it through said washing and humidifying means, and through and around said heating drum whereby the humidified air is warmed before being discharged into the room.

10. In an air conditioning apparatus, a casing having a chamber therein provided with cold and warm air conduits for connecting it with a room, a heating drum mounted in said chamber and having pipes connecting it with the smoke outlet of a furnace and with a chimney whereby the products of combustion from the furnace will circulate therethrough and heat the walls thereof, said heating drum having a central passage through which air circulating through said chamber may pass, a filtering member having perforated walls mounted in the lower portion of said chamber and provided with a cone-shaped top wall positioned beneath the passage in said drum, means for spraying water into said filtering member and against the perforated walls thereof, and a fan for drawing air from the room and circulating it through said filtering member and said chamber, whereby the air will be thoroughly washed and cleansed of impurities, and will be discharged back into the room as warm, humidified air.

11. In an apparatus of the class described, a casing having a chamber therein, warm and cold air conduits connecting said chamber with a room, a heating drum mounted within said chamber and having pipes connecting it with the smoke outlet of a furnace and with a chimney whereby the products of combustion discharging from the furnace will pass therethrough and heat the walls of said drum, the walls of said drum being spaced from the corresponding walls of said chamber to provide air circulating passages therebetween, and said heating drum having a vertical air circulating passage extending therethrough, means for drawing cold air from the room and circulating it upwardly through said vertical air passage and through the air circulating passages around said drum whereby said air is heated, and means for humidifying the air circulated through said chamber.

12. In an apparatus of the class described, a casing having a chamber therein, a cold air conduit connecting a room with the lower portion of said chamber, a warm air conduit connecting the upper portion of the chamber with the room, a heating drum mounted in said chamber with its walls spaced from the walls of said casing to provide air circulating passages, pipes connecting said drum with the smoke outlet of the furnace and with the chimney, said pipes being connected with the lower portion of said drum and situated at substantially the same elevation whereby the hot furnace gases may circulate through said drum and heat the walls thereof without being retarded, and means for circulating the air from the room through said chamber whereby it will be heated and discharged back into the room as warm air.

13. In an air conditioning apparatus, a casing having a chamber therein, a conduit connecting the lower portion of said chamber with a room and another conduit connecting the upper portion of the chamber with the room, a series of horizontally disposed deflectors situated at an intermediate portion of the chamber and extending from wall to wall, a nozzle for spraying water into the lower portion of said chamber in an upward direction, a refrigerating coil mounted in the lower portion of the chamber below said deflectors, means for drawing air from the room and circulating it through the spray of water in said chamber and into contact with said refrigerating coil, whereby the impure air received from the room will be thoroughly washed and cooled before being discharged back into the room, and a perforated plate in the lower portion of said chamber spaced from the bottom wall thereof and adapted to prevent surplus water dripping into the bottom of the casing from impinging against the bottom wall thereof.

14. In an air conditioning apparatus, a casing having a chamber therein, a conduit connecting the lower portion of said chamber with a room and another conduit connecting the upper portion of the chamber with the room, a series of horizontally disposed deflectors situated at an intermediate portion of the chamber and extending from wall to wall, means for delivering water into the upper portion of said chamber, means for conducting said water downwardly into the chamber, a nozzle for spraying water into the lower portion of said chamber in an upward direction, a refrigerating coil mounted in the lower portion of the chamber below said deflectors, and means for drawing air from the room and circulating it through the spray of water in said chamber and into contact with said refrigerating coil, whereby the impure air received from the room will be thoroughly washed and cooled before being discharged back into the room.

15. In an air conditioning apparatus, a casing having a chamber therein, conduits connecting said chamber with a room whereby air in the room may be circulated through the chamber, a heating drum in said chamber having pipes for connecting it with the smoke outlet of a furnace and with a chimney whereby when the furnace is operating, the products of combustion from the furnace will pass through said drum and heat its walls so that the air circulated through the chamber may be heated before being discharged back into the room, means for spraying water into said chamber, a blower for drawing air from the room and circulating it through the spray of water in the chamber to thoroughly wash and purify it, and means by which a suitable refrigerating medium may be supported in the lower portion of said chamber to cool the air circulated therethrough, when the furnace and said heating drum are inoperative, and whereby the apparatus may be utilized for supplying conditioned air to a room or building during the entire season, it being capable of supplying warm moist air to the building in cold weather, and cool washed air thereto in hot weather.

ARTHUR O. EDWARDS.